United States Patent
Hao

(10) Patent No.: US 10,712,915 B2
(45) Date of Patent: Jul. 14, 2020

(54) INFORMATION PRESENTATION USING A CLIENT ON A TERMINAL

(71) Applicant: Alibaba Group Holding Limited, George Town, Grand Cayman (KY)

(72) Inventor: Guojian Hao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 89 days.

(21) Appl. No.: 15/616,161

(22) Filed: Jun. 7, 2017

(65) Prior Publication Data
US 2017/0357735 A1    Dec. 14, 2017

(30) Foreign Application Priority Data

Jun. 8, 2016 (CN) .......................... 2016 1 0405022

(51) Int. Cl.
*G06F 3/00* (2006.01)
*G06F 3/0484* (2013.01)
*G06F 16/9038* (2019.01)
*G06F 8/38* (2018.01)
*G06F 9/451* (2018.01)
*G06F 3/023* (2006.01)

(52) U.S. Cl.
CPC ............ *G06F 3/0484* (2013.01); *G06F 3/023* (2013.01); *G06F 8/38* (2013.01); *G06F 9/451* (2018.02); *G06F 16/9038* (2019.01)

(58) Field of Classification Search
CPC .... G06F 17/30991; G06F 9/451; G06F 3/023; G06F 3/0484; G06F 8/38; G06F 16/9038
See application file for complete search history.

(56) References Cited

U.S. PATENT DOCUMENTS

| | | | |
|---|---|---|---|
| 6,801,229 B1 * | 10/2004 | Tinkler | G06F 17/30991 345/440 |
| 8,612,582 B2 | 12/2013 | Dare et al. | |
| 8,613,070 B1 | 12/2013 | Borzycki et al. | |
| 8,615,581 B2 | 12/2013 | Dare et al. | |
| 8,650,290 B2 | 2/2014 | Dare et al. | |
| 8,745,213 B2 | 6/2014 | Dare et al. | |
| 8,788,655 B2 | 7/2014 | Dare et al. | |
| 8,856,322 B2 | 10/2014 | Dare et al. | |
| 9,015,297 B2 | 4/2015 | Putman et al. | |
| 9,454,410 B2 | 9/2016 | Meijer et al. | |
| 2002/0049788 A1 | 4/2002 | Lipkin et al. | |
| 2002/0087661 A1 * | 7/2002 | Matichuk | B60P 3/34 709/218 |
| 2003/0136136 A1 | 7/2003 | Nomura et al. | |

(Continued)

FOREIGN PATENT DOCUMENTS

| | | |
|---|---|---|
| CN | 103514266 A | 1/2014 |
| CN | 103793244 A | 5/2014 |

(Continued)

*Primary Examiner* — Kieu D Vu
*Assistant Examiner* — Asteway T Gattew

(57) ABSTRACT

Disclosed are information presentation methods, devices, and systems. A client receives an information presentation request from an application, acquires presentation information resources according to the information presentation request, and sends the acquired presentation information resources to the application for the application to make a presentation. The client is configured to provide presentation information resources to applications.

15 Claims, 12 Drawing Sheets

(56) References Cited

U.S. PATENT DOCUMENTS

| | | |
|---|---|---|
| 2004/0117404 A1 | 6/2004 | Crivella et al. |
| 2004/0243668 A1* | 12/2004 | Harjanto ............ H04L 29/12169 709/203 |
| 2005/0172018 A1 | 8/2005 | Devine et al. |
| 2006/0282468 A1 | 12/2006 | Crivella et al. |
| 2008/0086564 A1 | 4/2008 | Putman et al. |
| 2008/0263103 A1 | 10/2008 | McGregor et al. |
| 2010/0070448 A1 | 3/2010 | Omoigui |
| 2011/0208822 A1 | 8/2011 | Rathod |
| 2011/0231361 A1 | 9/2011 | Patchava et al. |
| 2011/0239135 A1 | 9/2011 | Spataro et al. |
| 2012/0278454 A1 | 11/2012 | Stewart et al. |
| 2013/0332943 A1 | 12/2013 | Sun et al. |
| 2014/0020068 A1 | 1/2014 | Desai et al. |
| 2014/0289314 A1 | 9/2014 | Dare et al. |
| 2014/0337528 A1* | 11/2014 | Barton .................. H04L 41/00 709/225 |
| 2015/0134722 A1* | 5/2015 | Marshall ................ H04L 67/42 709/203 |
| 2016/0099963 A1 | 4/2016 | Mahaffey et al. |
| 2016/0103559 A1 | 4/2016 | Maheshwari et al. |
| 2016/0189444 A1 | 6/2016 | Madhok et al. |
| 2016/0347112 A1 | 12/2016 | Chow |
| 2017/0103215 A1 | 4/2017 | Mahaffey et al. |

FOREIGN PATENT DOCUMENTS

| | | |
|---|---|---|
| CN | 105117187 A | 12/2015 |
| JP | 2016029595 A | 3/2016 |

* cited by examiner

# INFORMATION PRESENTATION USING A CLIENT ON A TERMINAL

RELATED APPLICATION

This application claims priority to Chinese Patent Application No. 201610405022.5, filed on Jun. 8, 2016, with the State Intellectual Property Office of the People's Republic of China, incorporated herein by reference in its entirety.

TECHNICAL FIELD

Embodiments according to the present invention are related to the field of communications technologies, and in particular, to information presentation methods, devices, and systems.

BACKGROUND

With the development of communications technologies, more and more applications are being installed in a terminal (e.g., computer system) in order to meet ever-growing and diversified service requirements.

During startup of an application in the terminal, before an operation interface is entered, presentation information interfaces are presented to a user to provide information related to a product, service, and so on.

At present, various information presentation platforms provide access to presentation information mainly by providing a software development kit (SDK). An application in a terminal that uses an information presentation service installs an SDK provided by a corresponding information presentation platform as a part of the application, and the SDK is tightly coupled to the application. When the application is started, the SDK used for information presentation in the application requests presentation information resources from the information presentation platform and presents the presentation information resources after downloading them.

Because the application is tightly coupled to the SDK used for information presentation, a unified management operation on presentation information resources cannot be implemented.

SUMMARY

Embodiments according to the present disclosure provide information presentation methods, devices, and systems, which are used to reduce or eliminate tight coupling between an application and an SDK used for information presentation, allowing implementation of a unified management operation on presentation information resources.

In an embodiment, an information presentation method includes: receiving, by a client, an information presentation request of an application, wherein the client is configured to provide presentation information resources to a plurality of applications; acquiring, by the client, presentation information resources according to the information presentation request; and sending, by the client, the acquired presentation information resources to the application for the application to make a presentation.

In another embodiment, an information presentation method includes: receiving, by a first application, presentation information resources sent by a client according to an information presentation request, wherein the client is configured to provide presentation information resources to a plurality of applications; and making, by the first application, an information presentation according to the presentation information resources returned by the client.

In another embodiment, an information presentation method includes: receiving, by a server, a presentation information resources acquisition request sent by a client, wherein the client is configured to provide presentation information resources to a plurality of applications; performing, by the server, a processing step according to the presentation information resources acquisition request; and sending, by the server, a processing result to the client.

In an embodiment, a client device is disposed in a terminal and is configured to provide presentation information resources to applications in the terminal. In an embodiment, the client device includes: a first receiving module, configured to receive an information presentation request of an application in the terminal; an acquisition module, configured to acquire presentation information resources according to the information presentation request; and a presentation module, configured to send the acquired presentation information resources to the application for the application to make a presentation.

In an embodiment, a server includes: a first receiving module, configured to receive a presentation information resources acquisition request sent by a client in a terminal, wherein the client is configured to provide presentation information resources to a plurality of applications in the terminal; a processing module, configured to perform a processing step according to the presentation information resources acquisition request; and a first sending module, configured to send a processing result to the client.

In an embodiment, an information presentation system includes: a client, disposed in a terminal and configured to provide presentation information resources to a plurality of applications in the terminal; and a server, configured to interact with the client and send a presentation decision result and/or presentation information resources to the client.

In an embodiment, a terminal includes: a memory, configured to store computer program instructions; and a processor, coupled to the memory. The processor is configured to read the computer program instructions stored in the memory and respond by providing presentation information resources to a plurality of applications in the terminal, wherein the process of providing, by the processor, presentation information resources to one application includes: receiving an information presentation request of an application; acquiring presentation information resources according to the information presentation request; and sending the acquired presentation information resources to the application for the application to make a presentation.

In an embodiment, a server includes: a memory, configured to store computer program instructions; and a processor, coupled to the memory. The processor is configured to read the computer program instructions stored in the memory and respond by: receiving a presentation information resources acquisition request sent by a client in a terminal; performing a processing step according to the presentation information resources acquisition request; and sending a processing result to the client.

In the aforementioned embodiments, a client receives an information presentation request from an application, acquires presentation information resources according to the information presentation request, and sends the acquired presentation information resources to the application for the application to make a presentation. The client provides presentation information resources to applications in the terminal, to manage the presentation information resources` in a unified manner. Consequently, it is not necessary to install an SDK for information presentation as a part of an application, so that the degree of coupling between the application and the information presentation function is reduced, and it is possible to manage presentation information resources in a unified manner at a system architecture level.

DETAILED DESCRIPTION

Figure 1:
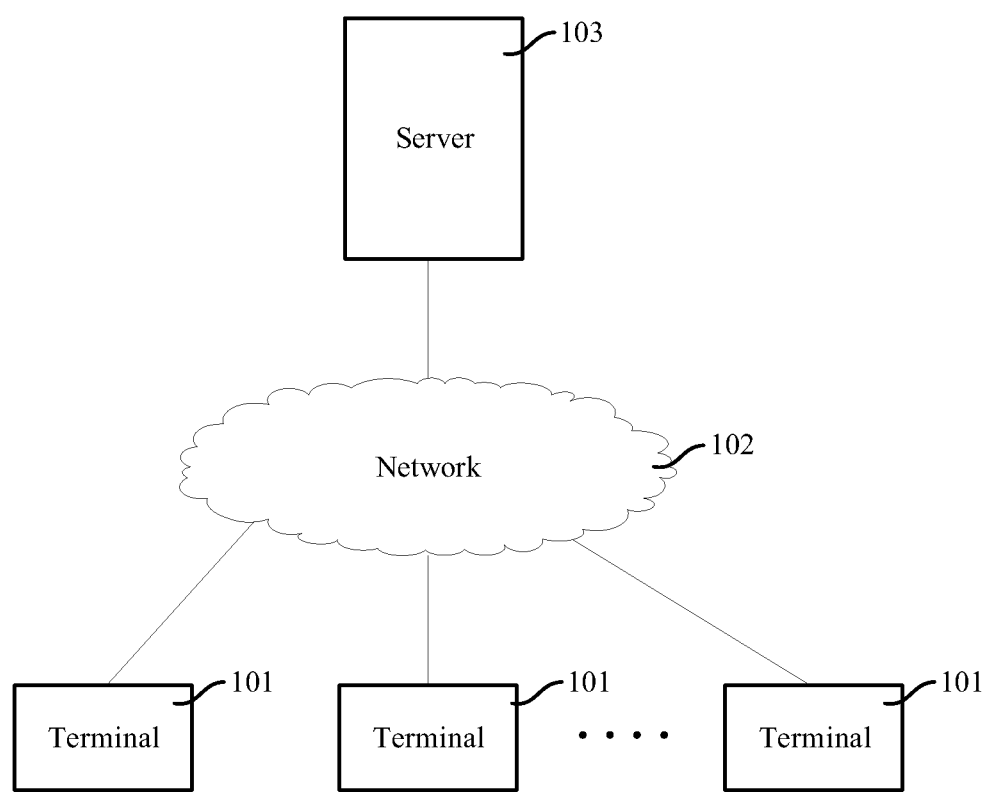
FIG. 1 is a block diagram illustrating an example of a network architecture in an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "providing," "sending," "creating," "acquiring," "executing," "allocating," "determining," "processing," "creating," "running," "generating," "writing," "making," "requesting," "searching," "collecting," "saving," "invoking," "performing," or the like, refer to actions and processes of an apparatus or computer system or similar electronic computing device or processor. A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Embodiments according to the present disclosure are described in detail below with reference to the accompanying drawings.

FIG. 1 is a block diagram of an example of a network architecture in an embodiment of the present disclosure. In the example of FIG. 1, the network architecture includes a terminal 101 and a server 103. There may be multiple terminals 101, and there may also be multiple servers 103

(only one server 103 is shown in FIG. 1). The terminal 101 and the server 103 can communicate through a network 102.

The terminal 101 has a client program (which may be referred to herein as a client), the server 103 has a server program (which may be referred to herein as a server), and the client and the server collaborate with each other to implement functions and services related to information presentation.

The terminal 101 may be a device such as a mobile terminal or a personal computer (PC), and a mobile terminal may be a mobile phone, a personal digital assistant (PDA), an intelligent wearable device, or the like.

The terminal 101 and the server 103 are capable of performing an information interaction through the network. The network may be a wide area network, a local area network, the Internet, or the Internet using a mobile communications technology. In an embodiment, the terminal 101 accesses the network in a wireless manner, and the server 103 accesses the network in a wired manner.

In an embodiment, the terminal 101 and the server 103 use a cloud computing technology and implement information processing with a powerful function based on the cloud computing technology. The terminal 101 and the server 103 may use an operating system based on the cloud computing technology, for example, YunOS, to integrate resources and services on the cloud and the terminal.

In an embodiment according to the present disclosure, the terminal is provided with a client, for example, by installing a client program. The client is configured to provide presentation information resources to applications in the terminal to implement unified management on the presentation information resources.

"Presentation information" as used in the present application refers to information that can be presented to a user when an application is started or is running. The information may include different media types such as, for example, text, graphics, voice, video, and so on, and the information is usually presented in the form of a page or an interface. In terms of the content of the presentation information, presentation information includes, but is not limited to, the following types of information: description information describing a product or service, for example, advertisement information; help information, for example, guidance information for using an application; and other information presentable to a user.

"Presentation information resources" as used herein refer to media data of the presentation information. For example, if the presentation information is presented in the form of a page, the presentation information resources refer to the page data.

Figure 2:
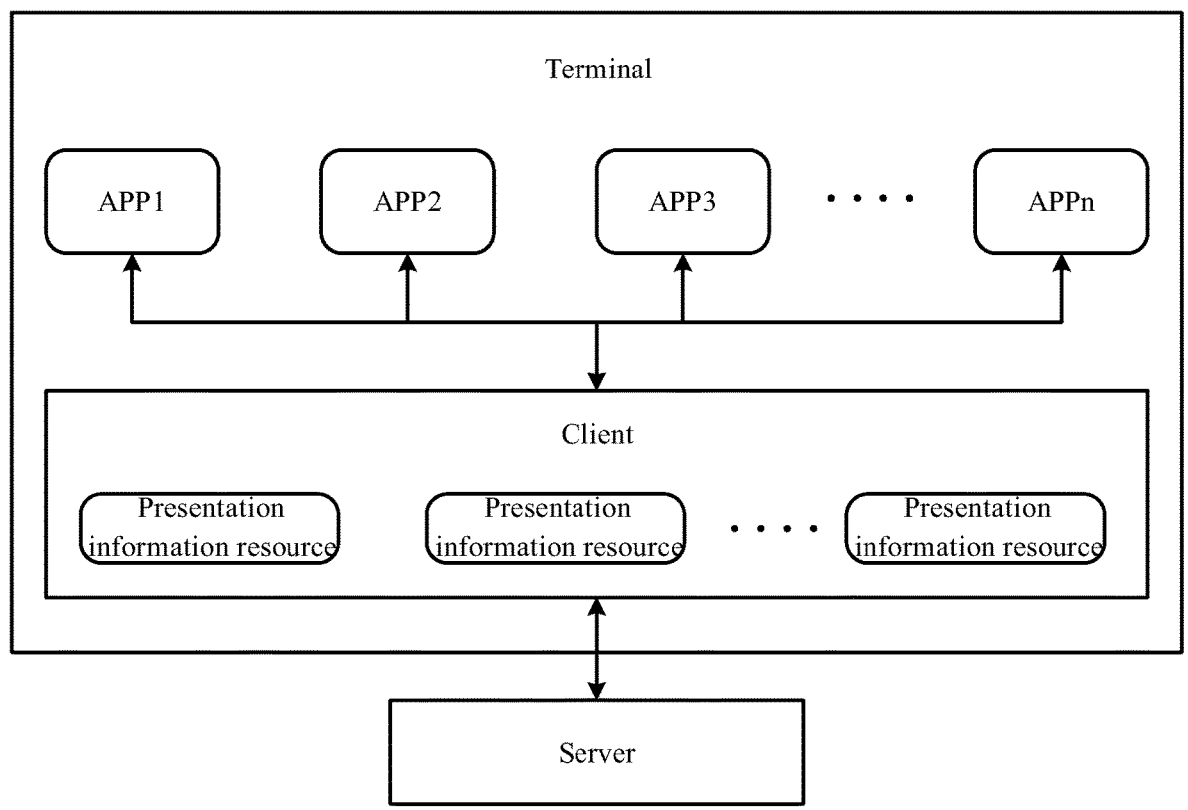
FIG. 2 is a block diagram illustrating an example of a system architecture in an embodiment of the present disclosure.

FIG. 2 is a block diagram illustrating an example of a system architecture in an embodiment of the present disclosure.

In the example of FIG. 2, the system architecture includes the components described below.

An application is configured to implement a specific service, for example, a social networking application, an instant messaging application, an online shopping application, or the like. The application can interact with a client and make an information presentation through that client. There may be one or more applications that can interact with the client, for example, APP1, APP2, APP3, and so on.

An application may also be a service component. Using YunOS as an example, the application may be a Page in YunOS. A Page is an abstraction of local services and remote services, namely, a basic unit of services, and can provide various services by encapsulating data and methods. One service scenario may include a plurality of Pages. By way of example, one Page may be a service such as a user interface (UI) or a photography service, or it may be a background service such as account authentication. A running Page is called a Page instance and is a carrier for running a local service or a remote service. Each Page can be uniquely identified in YunOS.

A client is configured to provide presentation information resources to an application. It can acquire presentation information resources for presentation according to a request from the application, and further, it can implement a management function for the presentation information resources. The client remains transparent to the application. The application may interact with the client using an application programming interface (API) provided by the client and also may implement information presentation through the client.

A client can perform unified management on presentation information resources. Specifically, in an embodiment, the client can provide presentation information resources to multiple applications in a terminal, and can further be configured to manage the presentation information resources of different information presentation platforms and/or manage the different presentation information resources of the same information presentation platform.

In an embodiment, the presentation information resources managed by the client come from a server. For example, the server may send presentation information resources to the client, or the client may download presentation information resources from the server according to an information presentation request from an application.

In an embodiment, the presentation information resources managed by the client are indexed in different manners or dimensions. For example, the presentation information resources may be indexed in terms of a service type (for example, a social networking-type application, an online shopping-type application, or the like), a category of presented content (for example, introduction information for a certain type of commodity or introduction information for a certain type of service), or a media type of data (for example, graphics, voice, or the like), or it may be indexed in terms of an information presentation platform from which the presentation information resources are sourced.

A server is configured to interact with the client and provide presentation information resources to the client, and can make a presentation decision based on a presentation policy. For example, the server may receive a presentation information resource acquisition request sent by the client, perform a processing step (for example, acquire presentation information resources requested by the client and/or make a presentation decision) according to the presentation information resource acquisition request, and send a processing result to the client.

By way of example, a function provided by the client may include one or more of the following:

acquiring presentation information resources according to an information presentation request from an application;

making a presentation decision on information presentation according to the information presentation request from the application; for example, the content of the decision may include one or more of the following: deciding whether to make an information presentation, determining to-be-presented information, determining a manner of the information presentation (for example, by means of an image or voice), determining an information presentation sequence, and so on;

collecting statistics on an information presentation operation according to an information presentation result to obtain statistical data related to the information presentation, where the statistical data may be further reported to the server; for example, the number of times the same presentation information resource is presented may be counted;

updating locally saved presentation information resources according to presentation information resources sent by the server;

updating a locally saved presentation policy according to a presentation policy sent by the server and used for making a presentation decision; and cleaning up presentation information resources to save storage space.

By way of example, the API provided by the client to the application may include one or more of the following: a resource query interface, for a request or query from the application for provided presentation information resources; and an interface for a request to make an information presentation, for invocation by the application to provide presentation information resources to the application.

Based on the aforementioned system architecture, an embodiment of an information presentation method or process is described below with reference to FIG. 3, FIG. 4, and FIG. 5.

Figure 3:
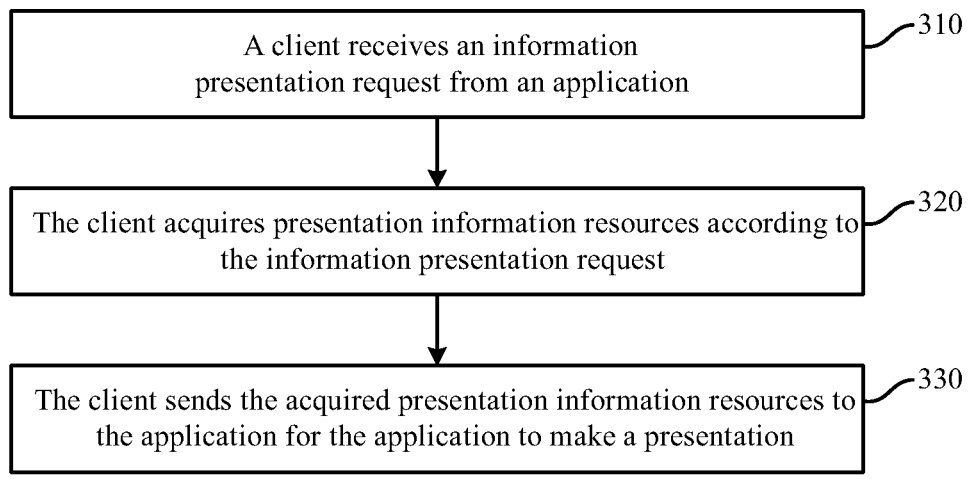
FIG. 3 is a flowchart illustrating information presentation in an embodiment of the present disclosure.
Figure 4:
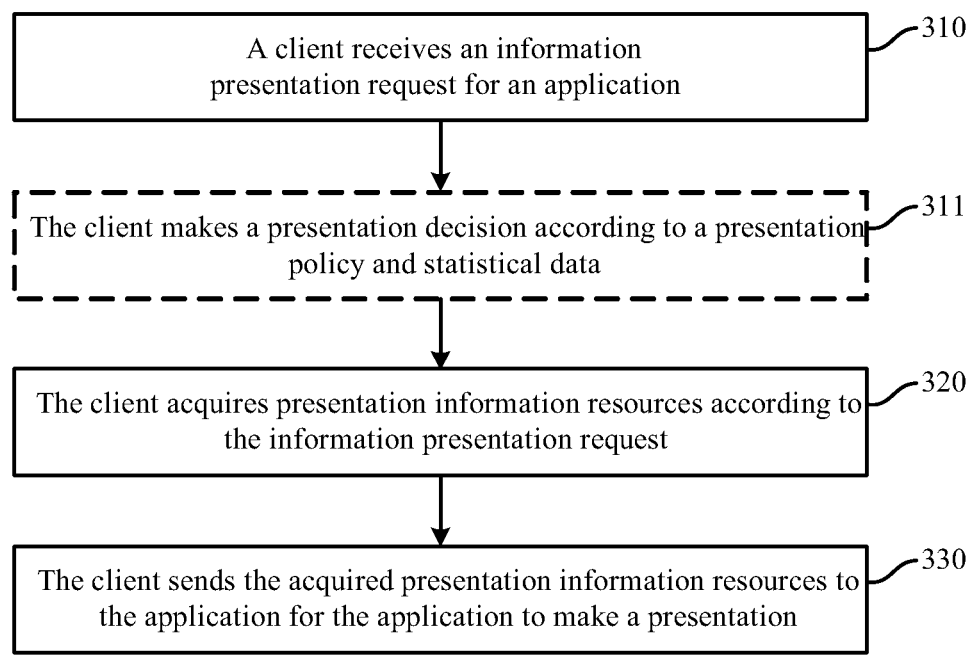
FIG. 4 is a flowchart illustrating information presentation in an embodiment of the present disclosure.

FIG. 3 is a flowchart illustrating information presentation in an embodiment according to the present disclosure.

In block 310, a client receives an information presentation request from an application.

In an embodiment, the client provides an API to the application, and the application invokes the client through the API to request that the client acquire presentation information resources for presentation.

In an implementation, when the application starts it sends an information presentation request to the client by invoking the API. The API provided by the client may also be invoked to send an information presentation request when information presentation is needed while running the application.

In some embodiments, an operating system (specifically, a system application or system service in the operating system) of a client (e.g., in a terminal) also triggers an information presentation request for the application upon detecting that the application is started.

In block 320, the client acquires presentation information resources according to the information presentation request. This operation may be implemented locally on the client, or it may be implemented in cooperation with a server.

In an embodiment, the client searches for presentation information resources saved locally on the client, according to the presentation information acquisition request. If presentation information resources saved on the client are found, then the found presentation information resources are accessed (acquired). Otherwise, a presentation information acquisition request is sent to the server to request acquisition of the presentation information resources. The network resource overhead can be reduced by acquiring presentation information resources saved on the client.

In an embodiment, the process of acquiring presentation information resources from the server by the client includes the following operations: the client sends a presentation information resource acquisition request to the server, and the server acquires corresponding presentation information resources according to the request and sends the presentation information resources to the client through a presentation information resource acquisition response. The presentation information acquisition request may carry related description information for requested presentation information, for example, an address of an information presentation platform from which the presentation information is sourced, a type of presented content, and so on. The information may be transferred to the client by the application when invoking the interface of the client, or it may be obtained through a presentation decision made by the client according to the information presentation request of the application.

In block 330, the client sends the acquired presentation information resources to the application for the application to make a presentation.

In an implementation, the acquired presentation information resources are presented first, when the application is started but an application interface is not yet presented. As an example, after an application in a mobile phone is started, presentation information resources are acquired and the presentation information resources are presented on the mobile phone's screen. After the presentation information resources are presented for a specified length of time or after a touch operation (for example, a slide operation of a finger on the mobile phone's screen) is received, the main interface of the application is presented. For example, information resources may be presented during rendering of the application interface.

The manner of presentation depends on the media type of the acquired presentation information resources. For example, if the media type is an image, then the image is presented on a terminal screen; and if the media type is a voice recording, then audio is played.

Further, in some embodiments, the client may make a presentation decision based on a presentation policy. Specifically, as shown in FIG. 4, operations in block 311 may be performed before block 320 of FIG. 3.

In block 311, the client makes a presentation decision according to a presentation policy and statistical data related to the information presentation. Accordingly, in block 320, the client acquires presentation information resources according to a presentation decision result.

As previously described, the client may make a presentation decision considering, for example, one or more of the following aspects: (1) determining whether to make an information presentation; (2) determining the to-be-presented presentation information; and (3) determining a presentation sequence and/or manner.

Determining Whether to Make an Information Presentation

The client determines whether to make an information presentation according to a presentation policy and statistical data related to the information presentation. If it is determined that an information presentation is to be made, then the subsequent operation of acquiring corresponding presentation information resources is performed; otherwise, the application is instructed to not make the information presentation and the application does not make the information presentation according to that instruction.

As an example of a presentation policy, the client can count the number of presentation operations of presentation information resources, so that when determining whether to perform the information presentation, the client can determine, according to statistical data about the number of information presentations, the number of times to-be-presented presentation information is presented in a prescribed period and then determine whether the number of times exceeds a threshold. If the threshold is exceeded, the client determines not to present the to-be-presented presentation information; otherwise, the client determines to present the to-be-presented presentation information. For example, when a navigation application in an automobile is started, an introduction page may need to be presented first, in which case the presentation policy specifies the maximum number of times the introduction page is to be presented per day (e.g., three times). In this example, when the navigation application is started for the fourth time within the same day, the client decides not to present the page. The client can thus control the presentation frequency of presentation information to avoid excessively frequent presentation of the presentation information of the same content in a short period of time, so as to reduce the processing resources overhead of a terminal and improve the user experience.

As another example of a presentation policy, statistical data related to the information presentation may include application start time (namely, the time at which the application is started) statistical data. When determining whether to make an information presentation, the client may determine the length of time from the last start time the application initiated the information presentation request. If the length of time exceeds a threshold, then it is determined to make an information presentation; otherwise, it is determined not to make an information presentation. For example, after receiving an information presentation request for an application, the client can determine the previous start time of the application, and if the time since the previous start time exceeds a threshold (for example, three days), then presentation information to be presented by the application can be presented; otherwise, if the time since the previous start time of the application is less than the threshold, then presentation information is not presented. Thus, repeated presentations are avoided and the user experience is improved.

The above presentation policies for determining whether to perform information presentation are merely examples, and other presentation policies may be defined.

Determining the to-be-Presented Presentation Information

The client can determine a type or content of to-be-presented information according to indication information carried in the information presentation request from the application. The application may carry description information related to the presentation information as parameters in the information presentation request and can send the related description information to the client. The description information can include, for example, a type of the presentation information, an information presentation platform to which the presentation information belongs, a service type of the presentation information, and the like.

The client can also determine a type, content, and so on of the to-be-presented presentation information according to a presentation policy and statistical data related to the information presentation.

The statistical data related to the information presentation may include user behavior statistical data, in which case the client can determine the to-be-presented presentation information according to a type of the application and user behavior statistical data for the application. For example, for a travel-related application, if the user behavior statistical data for the application indicates that the user inquired about a certain destination when previously using the application, then the client can determine that the to-be-presented presentation information when the application is next started is introduction information for that destination.

If a certain presentation policy specifies that a certain type of presentation information is not presented, then the client does not acquire resources for the particular type of presentation information.

The presentation policies given above are merely examples, and other presentation policies can be used to determine to-be-presented information.

Determining a Presentation Sequence and/or Manner

The client can also determine a presentation sequence and/or manner and the like according to a presentation policy and statistical data related to the information presentation. Specifically, the statistical data related to the information presentation may include the number of times or a frequency at which presentation information is presented. Accordingly, when determining the presentation sequence, the client can determine the presentation sequence according to that statistical data.

For example, presentation of multiple presentation information resources is allowed when one application is started. In this case, the client may acquire the numbers of times or the frequency at which the presentation information is presented. If a certain piece of presentation information or pieces of presentation information are presented a few times or at a low frequency, then the presentation sequence of that presentation information may be set as the preferential presentation.

In another example, presentation of multiple presentation information resources is allowed when one application is started. In this case, the client may determine a priority order of presentation (e.g., preferential presentation of car-related presentation information) according to content or types of the presentation information resources.

The above presentation policies for determining the presentation sequence and/or manner are merely examples, and other presentation policies can be used.

In an embodiment, the presentation policy used by the client is preset or is set or modified by the user. Accordingly, the client provides a setting interface for the user to set related content (for example, a presentation policy).

Figure 5:
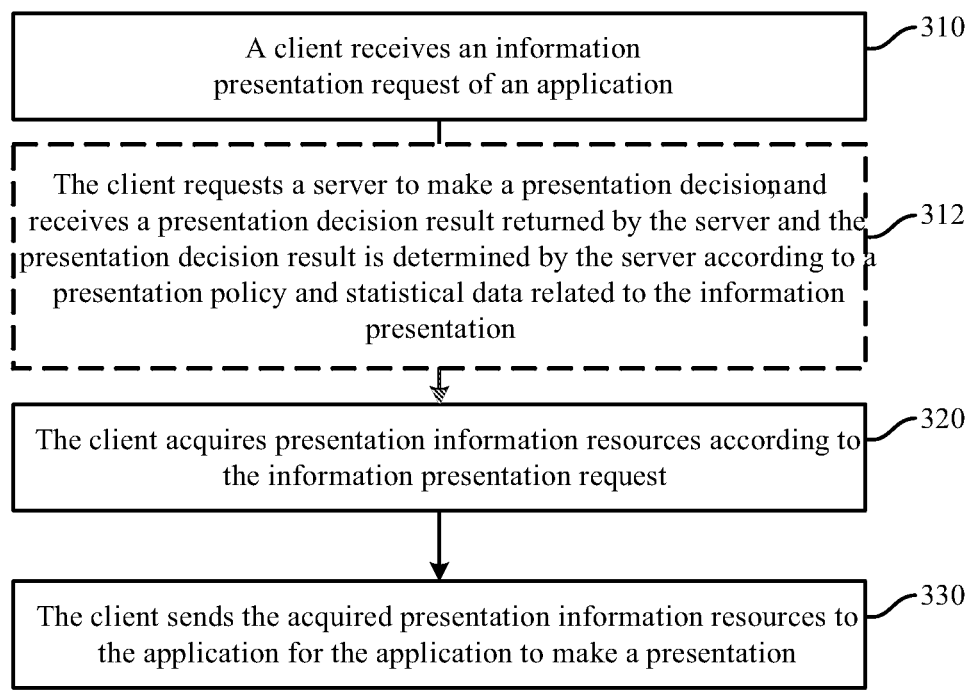
FIG. 5 is a flowchart illustrating information presentation in an embodiment of the present disclosure.

In some embodiments, as shown in FIG. 5, based on the flowchart shown in FIG. 3, the following operation is included before step 320.

In block 312, the client requests a server to make a presentation decision, and receives a presentation decision result returned by the server. The presentation decision result is determined by the server according to a presentation policy and statistical data related to the information presentation.

Accordingly, in block 320, the client acquires presentation information resources according to a presentation decision result.

The method for making a presentation decision by the server according to a presentation policy and statistical data related to the information presentation is similar to the method for making a presentation decision by the client. Further, the server can take advantage of analysis and processing based on big data, so that the decision to make a presentation is closer to user behaviors and habits, so that the information presentation more closely conforms to user preferences.

Figure 6:
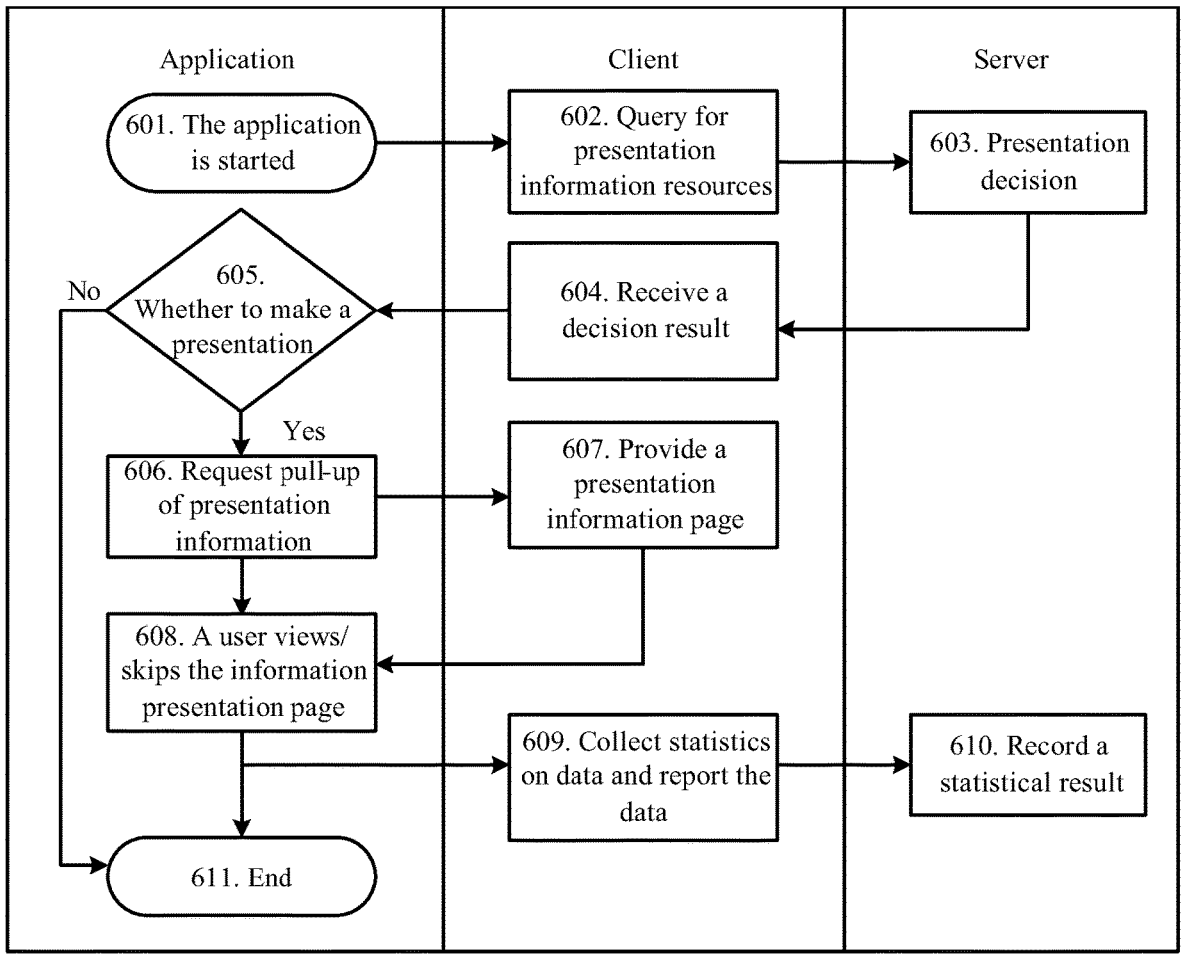
FIG. 6 is a flowchart illustrating information presentation in an embodiment of the present disclosure.

FIG. 6 is a flowchart of an embodiment of a method of making a presentation decision by the server based on a request from the client.

In block 601, an application is started, invokes an interface provided by a client, and queries whether there are presentation information resources.

In block 602, the client sends a request to the server to query whether there are corresponding presentation information resources.

In block 603, the server makes a presentation decision according to, for example, device information, address information, and use habits of a corresponding user carried in the request, then determines whether to make an information presentation and sends the resulting decision to the client.

In block 604, the client sends the decision to the application. If the server determines that an information presentation does not need to be performed, then the application is notified of that; otherwise, the application is notified to perform an information presentation during startup.

In block 605, if the application receives the notification to not perform an information presentation, then the flowchart proceeds to block 606, and if the application receives the notification to perform the information presentation, then the flowchart proceeds to block 611.

In block 606, the application sends a request to the client to request pull-up of presentation information.

In block 607, the client opens a page to upload the presentation information resources according to the request from the application, and presents the presentation information according to a presentation policy.

In block 608, the user may view the presentation information or skip the presentation information.

In blocks 609 and 610, the client collects statistics on an information presentation operation. For example, it collects statistics on the user's behavior with regard to participation in the information presentation (e.g., skipping or viewing), and reports statistical data related to the information presentation to the server.

In block 611, the information presentation process ends, the information presentation page is exited, and the application's own interface is entered.

In an embodiment, the client further collects statistics on an information presentation. For example, it collects statistics on the number of times or a frequency at which presentation information is presented and so on. The client may save statistical data related to the information presentation locally so that the client can make a presentation decision according to the statistical data. The client may also report the statistical data related to the information presentation to the server so that the server can make a presentation decision according to the statistical data. Further, the client may both save the statistical data locally and report the statistical data to the server.

In an embodiment, the server configures a presentation policy for the client. The server may send a presentation policy to the client at a set time or upon receiving a configuration instruction, or it may send a presentation policy to the client based on a request from the client. The presentation policy configured by the server for the client may be a predefined policy, or it may be determined by the server according to statistical data related to the information presentation reported by the client and/or user behavior statistical data.

In an embodiment, the server sends presentation information resources to the client. The server may send presentation information resources to the client at a set time or presentation information resources are updated, or it may send presentation information resources to the client based on a request from the client (for example, the client requests acquisition of presentation information resources from the server as described above). The presentation information resources sent by the server to the client may be determined by the server according to statistical data related to the information presentation reported by the client and/or user service behavior statistical data.

In an embodiment, the client cleans up (e.g., deletes) saved presentation information resources to save storage space. Specifically, the client may clean up presentation information resources at set times, or it may clean up presentation information resources upon receiving a cleanup instruction submitted by a user through a presentation information resource management interface, or it may clean up presentation information resources upon detecting that the available capacity of the storage space is lower than a threshold.

In an embodiment, to clean up presentation information resources, presentation information resources to be cleaned up may be determined and cleaned up according to, for example, presentation frequencies of presentation information resources, data volumes of the presentation information resources, presentation time, and so on.

For example, when it is detected that the available capacity of the storage space is lower than 30% of the total capacity, presentation information resources never presented or presentation information resources presented less frequently than others are selected and cleaned up according to the presentation frequencies of all saved presentation information resources.

In an implementation, the client is installed in an operating system of a smartphone, each mobile phone requires only one client, and all applications needing to access an information presentation service only need to invoke an interface provided by the client to acquire the to-be-presented presentation information.

After the client is upgraded, all the applications accessing the information presentation service can utilize the latest features of the client. Also, embodiments of the present disclosure solve the prior art problem in which an upgrade of an SDK of an information presentation platform depended on an upgrade of an application.

The APPs (FIG. 2) accessing the information presentation service can communicate with the client, and the client can control the display frequency of a piece of presentation information. The unified client can ensure that each presentation information resource is downloaded only once, so that storage space is saved.

The applications accessing the presentation information service can communicate with the client, so that the client can be aware of which application has been opened by the user and can recommend related presentation information for the usage history of a user. For example, consider an example in which there are two applications (A and B) in a mobile phone of a user, Application A is an application related to cars, Application B is an application related to online reading, and both applications access a client according to an embodiment of the present disclosure. The user uses Application A and, later the same day, the user opens Application B. In this example, the client can provide car advertisements in a targeted manner when Application B is opened because the client knows that the user previously used Application A. Due to this awareness of the usage history of the user, the client can provide precise advertisements that other information presentation platforms cannot.

Thus, a client receives an information presentation request for an application, acquires presentation information resources according to the information presentation request, and returns the acquired presentation information resources to the application for presentation, where the client is configured to manage presentation information resources in a unified manner. Because a client manages presentation information resources in a unified manner as introduced in this disclosure, it is not necessary to install an SDK for information presentation as a part of an application, so that the degree of coupling between the application and the information presentation function is reduced, and it is possible to manage presentation information resources in a unified manner at a system architecture level.

In an implementation, the application, the client, and the server run and interact with each other by means of a process. Specifically, an application process and a client process can implement query (search) and acquisition (access) of presentation information resources, collection of user operation events, and so on based on inter-process interactions, and the client process and a server process can implement acquisition of a presentation policy, acquisition of presentation information resources, collection of user operation events, and so on based on inter-process interactions.

Based on the above concepts, an embodiment of the present disclosure provides a client device, which can implement the information presentation process described above.

Figure 7A:
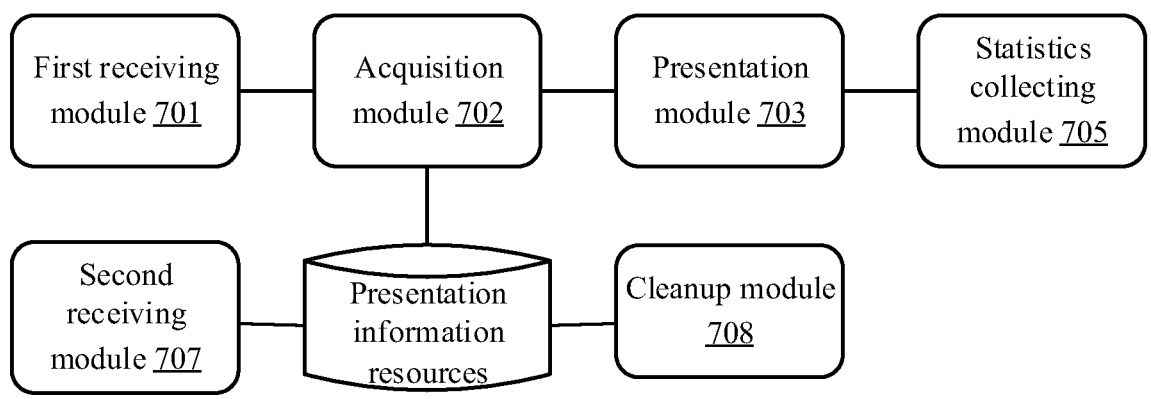
FIGS. 7A and 7B are block diagrams illustrating a client device in embodiments of the present disclosure.
Figure 7B:
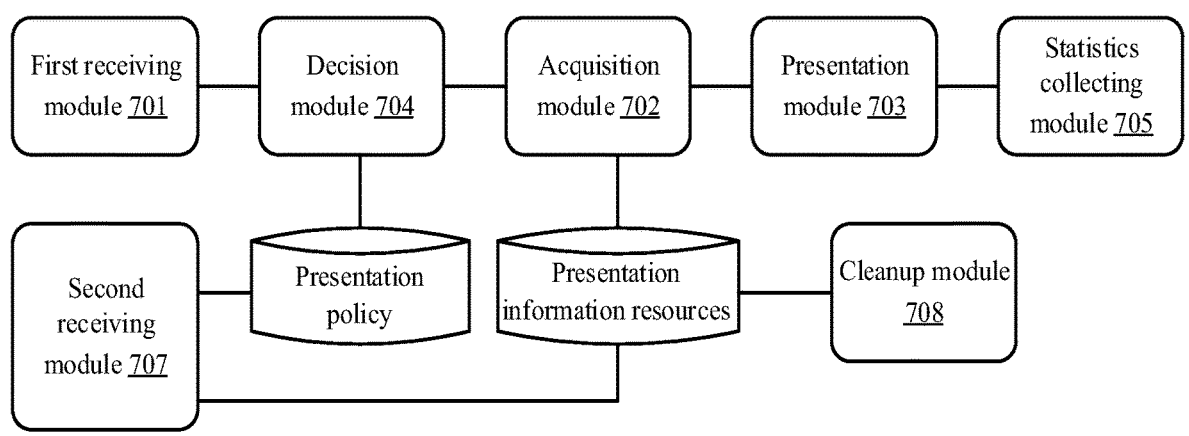

FIGS. 7A and 7B are block diagrams of a client device provided in an embodiment of the present disclosure. The device may be disposed in a terminal and can be configured to manage presentation information resources in a unified manner. Specifically, the client device can provide presentation information resources to a plurality of applications in the terminal, and can further be configured to manage presentation information resources of different information presentation platforms and/or manage different presentation information resources of the same information presentation platform.

In an embodiment, the device shown in FIG. 7A includes a first receiving module 701, an acquisition module 702, and a presentation module 703. In the embodiment of FIG. 7B, the device of FIG. 7A further includes a decision module 704.

The first receiving module 701 is configured to receive an information presentation request from an application.

The acquisition module 702 is configured to acquire presentation information resources according to the information presentation request.

The presentation module 703 is configured to send the acquired presentation information resources to the application so the application can make a presentation.

Before the presentation information resources are acquired, the decision module 704 is configured to make a presentation decision (according to a presentation policy and statistical data related to the information presentation according to the presentation information acquisition request) or to request a server to make a presentation decision and receive a presentation decision result returned by the server, where the presentation decision result is determined by the server according to a presentation policy and statistical data related to the information presentation. The acquisition module 702 acquires the presentation information resources according to the presentation decision result.

In an embodiment, the decision module 704 performs one or a combination of the following operations: determine whether to make an information presentation; determine to-be-presented presentation information; and determine a presentation sequence and/or manner.

The statistical data related to the information presentation includes statistical data on the number of the information presentation operations, and accordingly, when determining whether to make an information presentation, the decision module 704 is specifically configured to: determine, according to the statistical data, a frequency of the to-be-presented presentation information being presented in a set duration; and if the frequency exceeds a threshold, determine to present the to-be-presented presentation information and otherwise determine that the to-be-presented presentation information is not to be presented. Alternatively, the statistical data related to the information presentation includes application start time statistical data, and accordingly, when determining whether to make an information presentation, the decision module 704 is specifically configured to: determine the length of time from the last start time of the application initiating the information presentation request to the current time according to the application start time statistical data; and if that period exceeds a threshold, make an information presentation and otherwise, do not make an information presentation.

The statistical data related to the information presentation includes user behavior statistical data, and accordingly, when determining the to-be-presented presentation information, the decision module 704 is specifically configured to determine, according to the application type and user behavior statistical data for the application, the to-be-presented presentation information.

The statistical data related to the information presentation includes the number of times or a frequency at which presentation information is presented, and accordingly, when determining the presentation sequence, the decision module 704 is specifically configured to determine the presentation sequence according to the statistical data on the number of times or the frequency at which the presentation information is presented.

In an embodiment, the acquisition module 702 is configured to: search for presentation information resources saved on the client according to the presentation information acquisition request; and if saved presentation information resources are found, acquire the saved presentation information resources that are found and otherwise, send a presentation information acquisition request to the server to request acquisition of the presentation information resources.

In an embodiment, the device shown in FIG. 7A or FIG. 7B further includes a statistics collecting module 705. The statistics collecting module 705 is configured to collect statistics about an information presentation operation and save the statistical data related to the information presentation locally and/or report the statistical data related to the information presentation to the server.

In an embodiment, the device shown in FIG. 7A or FIG. 7B further includes a second receiving module 707 configured to receive a presentation policy and/or presentation information resources sent by the server. Further, the presentation policy and/or presentation information resources sent by the server are determined by the server according to the statistical data related to the information presentation reported by the client device.

In an embodiment, the device shown in FIG. 7A or FIG. 7B further includes a cleanup module 708, configured to clean up presentation information resources at set times or time intervals, in response to an event, or according to received instruction information.

Specifically, the cleanup module 708 may, upon detecting that available capacity of storage space is lower than a threshold, determine presentation information resources to be cleaned up according to one or more of presentation frequencies of presentation information resources, data volumes of the presentation information resources, and presentation time of the presentation information resources, and then clean up the presentation information resources that are to be cleaned up.

Based on above concepts, an embodiment of the present disclosure provides a terminal that can implement the information presentation processes described above.

Figure 8:
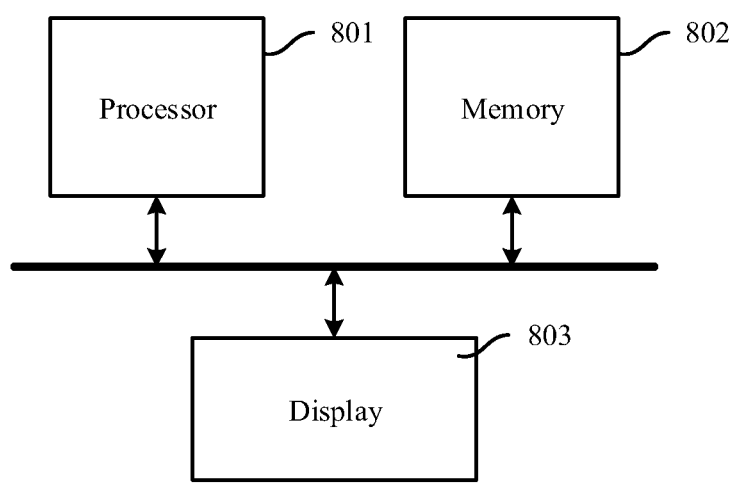
FIG. 8 is a block diagram of a terminal in an embodiment of the present disclosure.

FIG. 8 is a block diagram of a terminal in an embodiment of the present disclosure. In an embodiment, the terminal includes a processor 801, a memory 802, and a display 803.

In an embodiment, the processor 801 is coupled to the memory 802 and configured to read computer program instructions stored in the memory 802 and perform the following operations in response: acquire presentation information resources, and send the acquired presentation information resources to an application for presentation. In an embodiment, the operations include: providing presentation information resources to applications in the terminal in response, where the process of providing presentation information resources to an application includes: receiving an information presentation request from an application; acquiring presentation information resources according to the information presentation request; and sending the acquired presentation information resources to the application for the application to make a presentation.

The processor 801 may be a general-purpose processor (for example, a microprocessor or any conventional processor), a digital signal processor, an application-specific integrated circuit, a field programmable gate array or another programmable logical device, a discrete gate or a transistor logical device, or a discrete hardware component. The memory 802 may include an internal memory and/or external memory, for example, a storage medium such as a random access memory, a flash memory, a read-only memory, a programmable read-only memory or an electrically erasable programmable memory, or a register. The display 803 may include a touchscreen control circuit.

The processor 801 and other modules have a data communication connection, for example, data communication may be performed based on a bus architecture. The bus architecture may include any number of interconnected buses and bridges; specifically, various circuits of one or more processors represented by the processor 801 and memories represented by the memory 802 are linked together. The bus architecture may further link various other circuits such as peripherals, voltage regulators, and power management circuits together, which are well-known in the art and therefore will not be further described herein again. A bus interface provides an interface. The processor 801 is responsible for managing the bus architecture and processing, and the memory 802 can store data used by the processor 801 in performing operations.

The processes and methodologies disclosed herein may be applied to the processor 801 or implemented by the processor 801. During implementation, the operations may be implemented through an integrated logical circuit of hardware in the processor 801 or instructions in the form of software. The steps of the methods disclosed herein may be executed by a hardware processor or by a combination of hardware and software modules in a processor. The software module may be located in a storage medium such as a random access memory, a flash memory, a read-only memory, a programmable read-only memory or an electrically erasable programmable memory, or a register.

Based on the above concepts, an embodiment of the present disclosure provides a server, which can implement the information presentation process described above.

Figure 9:
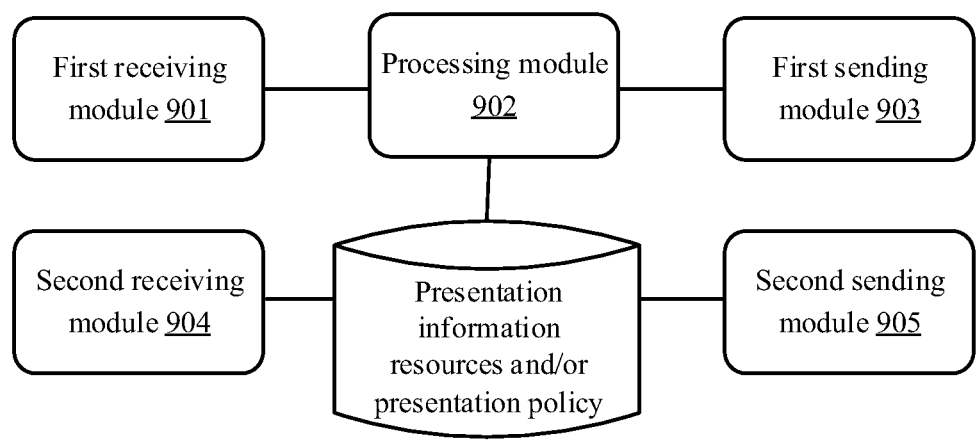
FIG. 9 is a block diagram of a server in an embodiment of the present disclosure.

FIG. 9 is a block diagram of a server in an embodiment of the present disclosure. In an embodiment, the server includes: a first receiving module 901, a processing module 902, a first sending module 903, and one or both of a second receiving module 904 and a second sending module 905.

In an embodiment, the first receiving module 901 is configured to receive a presentation information resource acquisition request sent by a client (e.g., a client in a terminal), where the client is configured to provide presentation information resources to applications (e.g., applications in the terminal).

The processing module 902 is configured to perform a processing step according to the presentation information resources acquisition request.

The first sending module 903 is configured to send a processing result to the client.

In an embodiment, the processing module 902 is configured to: make a presentation decision on the presentation information resource acquisition request, and return a presentation decision result to the client; or acquire presentation information resources according to the presentation information resource acquisition request, and send the acquired presentation information resources to the client.

In an embodiment, the processing module 902 is configured to make the presentation decision on the presentation information resources acquisition request according to a presentation policy and statistical data related to the information presentation.

In an embodiment, the processing module 902 is configured to perform one or a combination of the following operations: determine whether to make an information presentation; determine to-be-presented presentation information; and determine a presentation sequence and/or manner.

In an embodiment, the statistical data related to the information presentation includes statistical data on the number of the information presentation operations, and accordingly, the processing module 902 can be configured to: determine, according to the statistical data on the number of information presentations, a frequency of the to-be-presented presentation information being presented in a time period; and if the frequency exceeds a threshold, determine to present the to-be-presented presentation information and otherwise determine that the to-be-presented presentation information is not to be presented.

In an embodiment, the statistical data includes application start time statistical data; and accordingly, the processing module 902 can be configured to: determine a length of time from the last start time of the application initiating the information presentation request to the current time according to the application start time statistical data; and if the time period exceeds a threshold, then make an information presentation and otherwise do not make an information presentation.

In an embodiment, the statistical data related to the information presentation includes user behavior statistical data; and accordingly, the processing module 902 can be configured to determine the to-be-presented presentation information according to the application type and user behavior statistical data for the application.

In an embodiment, the statistical data related to the information presentation includes the number of times or a frequency at which presentation information is presented; and accordingly, the processing module 902 can be configured to determine the presentation sequence according to that statistical data.

In an embodiment, the second receiving module 904 is configured to receive statistical data related to the information presentation that is collected and reported by the client.

In an embodiment, the second sending module 905 is configured to send a presentation policy and/or presentation information resources to the client, where the presentation policy and/or presentation information resources sent by the server are determined by the server according to the statistical data related to the information presentation that is reported by the client.

An embodiment of the present disclosure provides an information presentation system that includes: a client, configured to provide presentation information resources to a plurality of applications; and a server, configured to interact with the client and send a presentation decision result and/or presentation information resources to the client. The client may be disposed in a terminal, and the applications may also be in the terminal.

Embodiments of the present disclosure provide a method and device for actively pushing presentation information resources to an application by a client. The system architecture of the client is shown in FIG. 2, and the network architecture applicable to the client is shown in FIG. 1.

Figure 10:
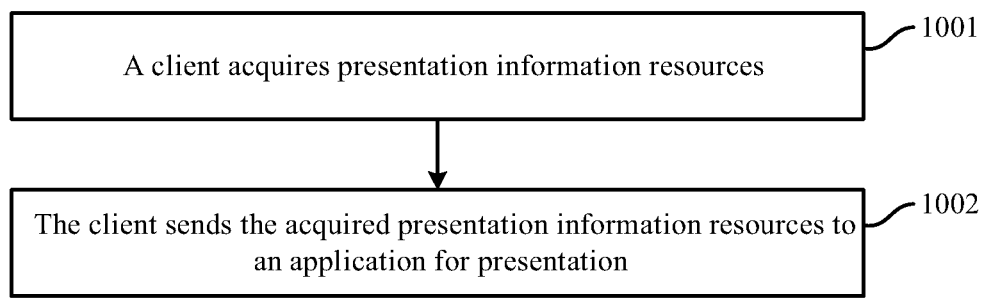
FIG. 10 is a flowchart of a method for pushing presentation information resources in an embodiment of the present disclosure.

FIG. 10 is a flowchart of a method for pushing presentation information resources in an embodiment of the present disclosure, where the method is performed by a client.

In block 1001, the client acquires presentation information resources.

In block 1002, the client sends the acquired presentation information resources to an application for presentation.

In an embodiment, the client determines the presentation information resources to be pushed to the application according to one or any combination of the following:

A type of the application. For example, if the application is a travel service type of application, the client acquires presentation information resources related to a travel service for the application.

A start frequency of the application. For example, if the number of starts of the application does not reach a threshold in a set time period (for example, one day or one week), presentation information resources are pushed for the application; otherwise, if the number of starts of the application reaches the threshold in the set time period, presentation information resources are not pushed to the application.

An information presentation frequency. For example, if the number of times an application presents a certain piece of presentation information does not reach a threshold in a set time period, the presentation information resource is pushed for the application. As another example, if the number of times a certain piece of presentation information is presented does not reach a threshold in a set time period, the presentation information resource is pushed to the application.

An environmental factor. For example, an environmental factor may include one or more of a network state of a terminal (for example, having or not having access to a wireless local area network, network transmission performance, and so on), a current time, and other environmental factors detectable by a sensor of the terminal. For example, if the terminal currently can access a wireless local area network, then the client may push presentation information resources to an application in the terminal. Further, if the terminal currently can access a wireless local area network, presentation information resources may be acquired from a server and sent to the application for presentation. Still further, if the terminal can currently access a wireless local area network, video-type presentation information resources may be acquired from a server and sent to the application for presentation.

User behavior information. For example, the client may acquire presentation information resources matching the user behavior information according to user behavior information saved locally or user behavior information acquired from a network, and send the corresponding presentation information resources to the application according to user requirements or preferences and then present the presentation information resources to the user.

The aforementioned bases used for determining presentation information resources to be pushed to the application are merely examples and the present invention is not so limited. For example, the presentation information resources may have priority attributes, and accordingly, presentation information may be pushed according to the priority attributes of the presentation information resources.

In an embodiment, the client performs the aforementioned operations and methods to push presentation information based on an event and/or according to a set time or time interval.

An event may include, but is not limited to, one or more of the following events: reception of a presentation information pushing instruction sent by an information server; an update of the terminal location; and a change of the state of the application (for example, the application changes from a background running state to a foreground running state).

In an embodiment, the client preferentially searches for presentation information resources saved locally on the client. If locally saved presentation information resources are found, the locally saved presentation information resources that are found are acquired; otherwise, a presentation information acquisition request is sent to the server to request acquisition of the presentation information resources. The network resource overhead can be reduced by preferentially acquiring locally saved presentation information resources.

Based on the above concepts, an embodiment of the present disclosure further provides a client device. The client device can implement the flowchart shown in FIG. 10.

Figure 11:
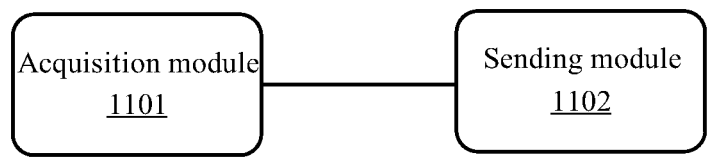
FIG. 11 is a block diagram of a client device in another embodiment of the present disclosure.

FIG. 11 is a block diagram of a client device according to an embodiment of the present disclosure. In this embodiment, the device includes an acquisition module 1101 and a sending module 1102.

The acquisition module 1101 is configured to acquire presentation information resources.

The sending module 1102 is configured to send the acquired presentation information resources to an application for presentation.

In an embodiment, the acquisition module 1101 determines the presentation information resources to be pushed to the application according to one or any combination of the following: a type of the application; a start frequency of the application; an information presentation frequency; an environmental factor; and user behavior information.

In an embodiment, the acquisition module 1101 performs the aforementioned method to push presentation information based on an event and/or according to a set time or time interval.

For example, the event may include, but is not limited to, one or more of the following events: reception of a presentation information pushing instruction sent by an information server; an update of the terminal location; and a change of the state of the application (e.g., the application changes from a background running state to a foreground running state).

In an embodiment, the acquisition module 1101 preferentially searches for presentation information resources saved locally on the client. If the locally saved presentation information resources are found, the locally saved presentation information resources that are found are acquired; otherwise, a presentation information acquisition request is sent to the server to request acquisition of the presentation information resources. The network resource overhead can be reduced by preferentially acquiring locally saved presentation information resources.

Based on the above concept, an embodiment of the present disclosure further provides a terminal that can implement the flowchart shown in FIG. 11.

The present disclosure is described with reference to flowcharts and/or block diagrams of a method, a device (system), and a computer program product according to embodiments of the present application. It should be understood that each operation and/or block in the flowcharts and/or block diagrams and a combination of the methods, operations and/or blocks in the flowcharts and/or block diagrams may be implemented by computer program instructions. These computer program instructions may be provided to a processor of a general-purpose computer, a special-purpose computer, an embedded processor, or another programmable data processing device to produce a machine such that instructions executed by the processor of the computer or another programmable data processing device generate means for implementing functions specified in one or more operations of the flowcharts and/or one or more blocks of the block diagrams.

These computer program instructions may also be stored in a computer readable memory that can direct a computer or another programmable data processing device to operate in a particular manner, such that the instructions stored in the computer readable memory produce an article of manufacture including instruction means, the instruction means implementing the functions specified in one or more operations of the flowcharts and/or one or more blocks of the block diagrams.

These computer program instructions may also be loaded onto a computer or another programmable data processing device such that a series of operational steps are performed on the computer or another programmable device to produce computer-implemented processing, and thus the instructions executed on the computer or another programmable device provide the steps for implementing the functions specified in one or more operations of the flowcharts and/or one or more blocks of the block diagrams.

Although embodiments of the present disclosure have been described, those skilled in the art can make other alterations and modifications to these embodiments based on the basic inventive concepts. Therefore, it is intended that the appended claims are interpreted as including these embodiments and all alterations and modifications falling within the scope of the present disclosure.

Embodiments according to the invention are thus described. While the present disclosure has been described in particular embodiments, it should be appreciated that the invention should not be construed as limited by such embodiments, but rather construed according to the following claims.

What is claimed is:

1. An information presentation method, comprising:
   receiving, by a client program installed on a terminal, an information presentation request from an application of a plurality of applications installed on the terminal, wherein the client program receives information presentation requests from the applications through an application programming interface (API) and provides presentation information resources to the applications through the API in response to the information presentation requests;
   in response to said receiving, determining whether to make an information presentation of a presentation resource according to a presentation decision, wherein the presentation decision is made according to a presentation policy and statistical data related to the information presentation, wherein the presentation policy comprises:
      determining whether a number of times the presentation information resource was presented during a period of time exceeds a threshold;
   acquiring, by the client program, the presentation information resource when the number of times does not exceed the threshold, wherein said acquiring comprises:
      searching, by the client program, presentation information resources saved on the client program; and
      if the presentation information resource is saved on the client program, then accessing the presentation information resource saved on the client program and, if the presentation information resource is not saved on the client program, then sending a presentation information acquisition request to a server to request acquiring the presentation information resource; and
   sending, by the client program, the presentation information resource to the application for the application to make the information presentation.

2. The method according to claim 1, further comprising, before said acquiring:
   requesting, by the client program, the server to make the presentation decision; and
   receiving, at the client program, a result of the presentation decision returned by the server, wherein the result is determined by the server according to the presentation policy and the statistical data related to the information presentation.

3. The method according to claim 1, further comprising, before said acquiring:
   determining to-be-presented presentation information; and
   determining a presentation sequence and/or manner.

4. The method according to claim 1, further comprising:
   collecting, by the client program, statistics on an information presentation operation to obtain the statistical data related to the information presentation; and
   performing at least one of: saving, by the client program, the statistical data related to the information presentation locally; and reporting the obtained statistical data related to the information presentation to the server.

5. An information presentation method, comprising:
   receiving, by a first application of a plurality of applications installed on a terminal, presentation information resources sent by a client program according to an information presentation request, wherein the client program is installed on the terminal and is configured to provide the presentation information resources to the plurality of applications installed on the terminal, wherein the client program receives information presentation requests from the applications through an application programming interface (API) and provides the presentation information resources to the applications through the API in response to the information presentation requests, wherein the client program is further configured to acquire the presentation information resources by:

in response to said receiving, determining whether to make an information presentation of a presentation resource according to a presentation decision, wherein the presentation decision is made according to a presentation policy and statistical data related to the information presentation, wherein the presentation policy comprises:
   determining whether a number of times the presentation information resource was presented during a period of time exceeds a threshold;
when the number of times does not exceed the threshold, then: searching presentation information resources saved on the client program for the presentation resource; and if the presentation information resource is saved on the client program, then accessing the presentation information resource saved on the client program and, if the presentation information resource is not saved on the client program, then sending a presentation information acquisition request to a server to request acquiring the presentation information resource; and
making, by the first application, an information presentation according to the presentation information resource returned by the client program.

6. The method according to claim 5, further comprising, before the client program acquires the presentation information resources:
requesting, by the client program, the server to make the presentation decision; and
receiving, at the client program, a result of the presentation decision returned by the server, wherein the result is determined by the server according to the presentation policy and the statistical data related to the information presentation.

7. The method according to claim 5, further comprising, before the client program acquires the presentation information resources:
determining to-be-presented presentation information; and
determining a presentation sequence and/or manner.

8. The method according to claim 5, further comprising:
collecting, by the client program, statistics on an information presentation operation to obtain the statistical data related to the information presentation; and
performing at least one of: saving, by the client program, the statistical data related to the information presentation locally; and reporting the obtained statistical data related to the information presentation to the server.

9. A non-transitory computer-readable storage medium having computer-executable instructions that, when executed, cause a client program installed on a terminal to perform an information presentation method comprising:
receiving an information presentation request from an application of a plurality of applications installed on the terminal, wherein the client program receives information presentation requests from the applications through an application programming interface (API) and provides the presentation information resources to the applications through the API in response to the information presentation requests;
in response to said receiving, determining whether to make an information presentation of a presentation resource according to a presentation decision, wherein the presentation decision is made according to a presentation policy and statistical data related to the information presentation, wherein the presentation policy comprises:
determining whether a number of times the presentation information resource was presented during a period of time exceeds a threshold;
acquiring the presentation information resource when the number of times does not exceed the threshold, wherein said acquiring comprises:
searching, by the client program, for presentation information resources saved on the client program; and
if the presentation information resource is saved on the client program, then accessing the presentation information saved on the client program and, if the presentation information resource is not saved on the client program, then sending a presentation information acquisition request to a server to request acquiring the presentation information resource; and
sending the presentation information resource to the application for the application to make the information presentation.

10. The non-transitory computer-readable storage medium of claim 9, wherein the method further comprises:
requesting a server to make the presentation decision; and
receiving a result of the presentation decision made by the server, wherein the result is determined by the server according to the presentation policy and the statistical data related to the information presentation.

11. The non-transitory computer-readable storage medium of claim 9, wherein the method further comprises:
collecting statistics on information presentation operations; and
performing at least one of saving the statistical data locally and reporting the statistical data to the server.

12. A terminal, comprising:
a memory, configured to store computer program instructions; and
a processor, coupled to the memory and configured to execute the computer program instructions stored in the memory, wherein the computer program instructions execute a client program on the terminal, wherein the client program performs the following operations:
providing presentation information resources to a plurality of applications installed in the terminal, wherein the client program receives information presentation requests from the applications through an application programming interface (API) and provides the presentation information resources to the applications through the API in response to the information presentation requests, wherein providing presentation information resources to an application installed in the terminal comprises:
receiving an information presentation request from the application;
in response to said receiving, determining whether to make an information presentation of a presentation resource according to a presentation decision, wherein the presentation decision is made according to a presentation policy and statistical data related to the information presentation, wherein the presentation policy comprises:
determining whether a number of times the presentation information resource was presented during a period of time exceeds a threshold;
acquiring the presentation information resource when the number of times does not exceed the threshold, wherein said acquiring comprises:
searching, by the client program, for presentation information resources saved on the client program; and if the presentation information resource is saved on the client program, then accessing the presentation information resource saved on the client program and, if the presentation information resource is not saved on the client program, then sending a presentation information acquisition request to a server to request acquiring the presentation information resource; and sending the presentation information resource to the application for the application to make the information presentation.

13. The terminal of claim 12, wherein the operations further comprise, before said acquiring:

requesting, by the client program, the server to make the presentation decision; and receiving, at the client program, a result of the presentation decision returned by the server, wherein the result is determined by the server according to the presentation policy and the statistical data related to the information presentation.

14. The terminal of claim 12, wherein the operations further comprise, before said acquiring:

determining to-be-presented presentation information; and determining a presentation sequence and/or manner.

15. The terminal of claim 12, wherein the operations further comprise:

collecting, by the client program, statistics on an information presentation operation to obtain the statistical data related to the information presentation; and performing at least one of: saving, by the client program, the statistical data related to the information presentation locally; and reporting the obtained statistical data related to the information presentation to the server.

* * * * *